(12) United States Patent
Martin

(10) Patent No.: US 7,344,656 B2
(45) Date of Patent: Mar. 18, 2008

(54) STORING A COMPOSITION IN AN ALCOHOLIC GEL

(75) Inventor: Perry L. Martin, Yuba City, CA (US)

(73) Assignee: Truox, Inc., McClellan, CA (US)

( * ) Notice: Subject to any disclaimer, the term of this patent is extended or adjusted under 35 U.S.C. 154(b) by 99 days.

(21) Appl. No.: 10/913,976

(22) Filed: Aug. 6, 2004

(65) Prior Publication Data

US 2005/0032660 A1 Feb. 10, 2005

Related U.S. Application Data

(60) Provisional application No. 60/493,538, filed on Aug. 8, 2003.

(51) Int. Cl.
*C01B 18/08* (2006.01)
*C01B 15/10* (2006.01)
*A01N 25/04* (2006.01)
*C11D 7/18* (2006.01)
*C11D 7/38* (2006.01)

(52) U.S. Cl. ............................ 252/186.26; 252/186.27; 252/186.28; 252/186.29; 252/186.3; 252/186.31; 252/186.32; 424/613; 510/131; 510/221; 510/223; 510/304; 510/371; 510/383; 510/384

(58) Field of Classification Search ............ 252/186.26
See application file for complete search history.

(56) References Cited

U.S. PATENT DOCUMENTS

| 4,105,827 A | * | 8/1978 | Brichard et al. ............ 428/403 |
| 4,239,640 A | * | 12/1980 | Williams et al. ............ 510/442 |
| 4,692,329 A | * | 9/1987 | Klein et al. .................... 514/29 |
| 4,971,782 A | * | 11/1990 | Rudy et al. .................... 424/53 |
| 5,059,417 A | * | 10/1991 | Williams et al. .............. 424/53 |
| 5,085,853 A | * | 2/1992 | Williams et al. .............. 424/53 |
| 5,194,176 A | * | 3/1993 | Copenhafer et al. ... 252/186.27 |
| 5,595,731 A | | 1/1997 | Vallieres ..................... 424/76.4 |
| 5,874,385 A | * | 2/1999 | Mzik et al. ................. 507/211 |
| 6,221,826 B1 | * | 4/2001 | Surutzidis et al. .......... 510/349 |

FOREIGN PATENT DOCUMENTS

EP 202359 B1 * 1/1994

* cited by examiner

*Primary Examiner*—Joseph D. Anthony

(57) ABSTRACT

Stable oxidizing compositions and a method of preparing such compositions are presented. The compositions include a peroxygen, for example, a potassium monopersulfate or, percarbonate particle suspended in an alcoholic gel. The alcohol content in the gel is such that the peroxygen particle is prevented from coming into contact with water during storage, thereby helping maintain a high available oxygen level. When the alcoholic gel is mixed with water, it becomes less viscous and exposes the peroxygen particle to the water. The peroxygen is ready for use when it dissolves in the water.

50 Claims, 2 Drawing Sheets

STORING A COMPOSITION IN AN ALCOHOLIC GEL

RELATED APPLICATION

This application claims the benefit of U.S. Provisional Patent Application Ser. No. 60/493,538 filed on Aug. 8, 2003 under 35 U.S.C. § 119(e) and incorporates by reference the entire Provisional Application.

FIELD OF INVENTION

The invention relates generally to a method of stabilizing reactive compounds and particularly to a method of stabilizing potassium monopersulfate.

BACKGROUND

Potassium monopersulfate ($KHSO_5$), also known as potassium peroxymonosulfate, is a component of a triple salt with the formula $2KHSO_5$—$KHSO_4$—$K_2SO_4$. Due to the high oxidation potential of potassium monopersulfate ("PMPS"), the PMPS triple salt $2KHSO_5$—$KHSO_4$—$K_2SO_4$ makes a good candidate as a component in bleaches, cleansing agents, detergents, and etching agents, and also as an oxidizing agent in inorganic reactions.

Although PMPS' strong oxidation potential is well known, PMPS is limited in its utility because it is difficult to store. Currently, PMPS or blends containing PMPS must be in a dry powder form to be stored. Although PMPS is useful in the form of aqueous solutions, the available oxygen (AO) level decreases over time when PMPS is in the dissolved state (see FIG. 2). The decrease of AO level over time is temperature and pH dependent, and these parameters have been adjusted to allow for increased storage time of PMPS solutions. For example, aqueous solutions of PMPS are sometimes stored in a refrigerator to reduce the rate of AO loss.

As refrigerated handling adds to the transport and storage costs, and is not always available, the search continues for a stable PMPS solution or suspension in liquid or gel form.

A cost-effective method of storing PMPS while controlling the AO level decrease would allow PMPS to be used in many more applications.

SUMMARY

In one aspect, the invention is a stable oxidizing composition that includes a potassium monopersulfate particle and an alcoholic gel surrounding the potassium monopersulfate particle. The alcoholic gel includes an alcohol that is gelified by a polymer, such that the alcoholic gel exposes the potassium monopersulfate particle to water upon being diluted with water.

In another aspect, the invention is a method of preparing an oxidizing composition. The method entails preparing an alcoholic gel by combining an alcohol with a polymer and suspending a potassium monopersulfate particle in the alcoholic gel. The alcoholic gel exposes the potassium monopersulfate particle to the environment upon being mixed with water.

In yet another aspect, the invention is a stable oxidizing composition that includes a particle containing a peroxygen compound and an alcoholic gel surrounding the particle. The alcoholic gel includes an alcohol that is gelified by a polymer, such that the alcoholic gel exposes the particle to water upon being diluted with water.

BRIEF DESCRIPTION OF THE DRAWING(S)

DESCRIPTION OF THE PREFERRED EMBODIMENT(S)

Embodiments of the invention are described herein in the context of PMPS, and particularly in the context of stabilizing PMPS for storage. However, it is to be understood that the embodiments provided herein are just preferred embodiments, and the scope of the invention is not limited to the applications or the embodiments disclosed herein. For example, the embodiments may be adapted to be used with any peroxygen compound other than PMPS, such as percarbonate.

An "alcohol," as used herein, is an organic compound containing the hydroxyl (—OH) functionality. A "polymer," as used herein, is a material having at least one repeating monomeric unit and includes both polymers and copolymers. A "copolymer" is a polymer having at least two different monomeric units. As used herein, a "gel," or something that is "gelified" is a colloidal solution with adjustable viscosity, (i.e.—becomes less viscous upon being mixed with a bulk quantity of liquid).

This invention is based on the discovery that PMPS has a low solubility in many alcohols including ethanol (ethyl alcohol, EA), methanol (methyl alcohol, MA), and isopropyl alcohol (IPA). When PMPS crystals are added to these solvents in a container, the crystals fall to the bottom of the container substantially undissolved. It has also been found that the stability of the PMPS' AO level in any of these alcohols is proportional to the amount of water in the solution. Storing PMPS under 100% alcohol, the PMPS maintains about the same AO as for PMPS stored under dry conditions, as shown in Table 1.

TABLE 1

| AO levels of PMPS in Various Solvents | | | | |
|---|---|---|---|---|
| | CONTROL | IPA | EA | MA |
| 0 days | 4.41 | 4.41 | 4.41 | 4.41 |
| 7 days | 4.41 | 4.4 | 4.41 | 4.39 |
| 14 days | 4.4 | 4.41 | 4.42 | 4.4 |

Figure 1:
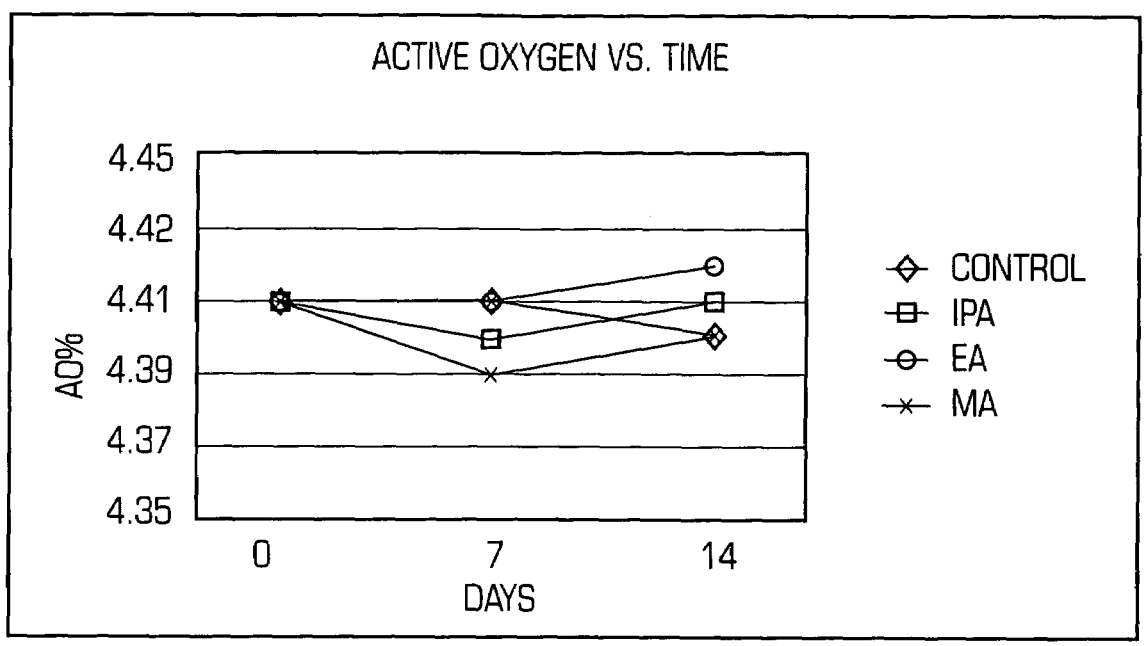
FIG. 1 is a plot showing the AO levels of PMPS in different alcohols.
Figure 2:
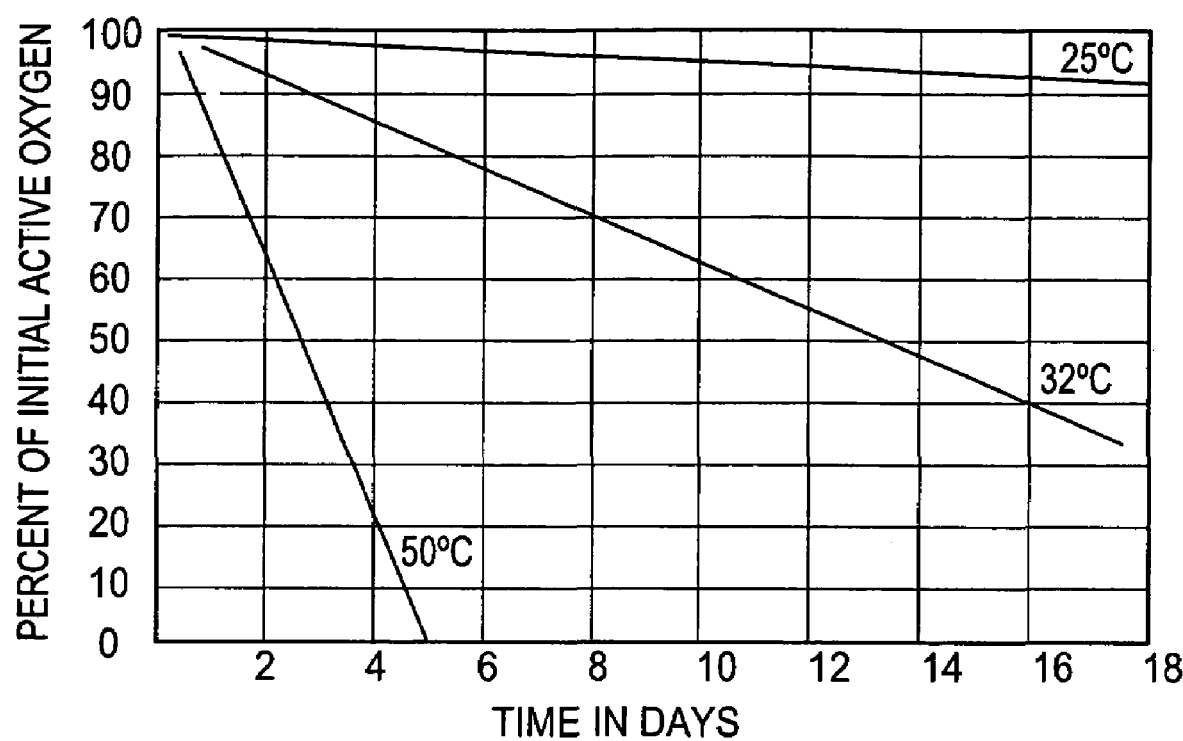
FIG. 2 is a plot showing the AO levels as a function of time in PMPS solutions.

FIG. 1 is a plot showing the AO levels of PMPS in different alcohol solvents. All alcohols are 100%, and the data was taken over a two-week period. Multiple samples were tested and the only differences in the results were within the statistical error range of the measurement method.

To prevent a rapid decrease in the AO level, the concentration of the alcohol in the alcoholic solvent is preferably as close to 100% as possible. However, alcoholic solvents such as 96 wt. % alcohol and 4 wt. % water, or 80 wt. % alcohol and 20 wt. % water, may be used. The weight fraction of alcohol has to be high enough to tie up the water molecules and keep them away from the PMPS particles. When the concentration of alcohol in the solvent is low, the PMPS may be coated with a non-water-soluble material to prevent the PMPS from dissolving.

A polymer, such as one of the Carbopol® Polymers, is combined with the alcoholic solvent to create an alcoholic gel. A Carbopol® polymer, which is combined with the alcohol to increase the viscosity of the alcohol, is a high molecular weight polymer of acrylic acid crosslinked with a polyalkenyl polyether. A Carbopol® polymer may be used to develop products with a wide range of flow and rheological properties. When combined with alcohol at concentrations below 1 wt. % of the combined product, the alcohol becomes more viscous. Other types of polymers, such as sodium polyacrylate, may be used. Generally, the amount of polymer is between about 0.1 wt. % and 10 wt. % of the weight of the alcohol it is mixed with.

PMPS and any other additives are mixed into the alcoholic gel to be suspended in the gel. The PMPS preferably contains between about 40 wt. % and about 75 wt. % $KHSO_5$. Methods of producing PMPS are well known. In addition to the conventional methods, the methods disclosed in U.S. patent application Ser. Nos. 10/878,898. and 10/878, 169, which are incorporated herein by reference, may also be used to produce PMPS that is suitable for this invention. The viscosity of the alcoholic gel is high enough to prevent any insoluble and dispersed components (e.g., PMPS) from sinking to the bottom. Encapsulated by the alcoholic gel, the PMPS and the additives are made stable enough for storage over 10° F. to 110° F.

The alcoholic gel shields the PMPS from moisture in the environment during storage. However, when the alcoholic gel is placed in contact with a bulk quantity of water, the gel is diluted to a less viscous form and the PMPS is allowed to dissolve in the bulk water. The PMPS solution that forms is ready for use.

By preventing the decrease in AO level, the alcoholic gel preserves the oxidation potential of the PMPS during storage. By adding various other additives (surfactants, perfumes, etc.) to the alcoholic gel, the PMPS suspended in alcoholic gel may be made useful in numerous applications. For example, the PMPS suspended in alcoholic gel may be used as dish washing gel, laundry gel, hand sanitizer gel, etc.

Although PMPS has a low solubility in alcohol, its solubility in water is significantly higher. Thus, when a mixture of alcohol and water is used for the alcoholic gel, the PMPS may be coated to enhance its stability during storage. Coating the PMPS particles with a non-water-soluble material such as a polysaccharide, a silicate, or a polymer further improves the stability of PMPS during storage. Examples of suitable polysaccharides include chitin, chitosan, and cellulose acetates. The silicate may be a metasilicate, borosilicate, alkyl silicate, or polysiloxanes. The polymer may be polymaleic acid, polyacrylic acid, polymethacrylate, or polyacrylamide, or a copolymer such as sulfonated maleic anhydride copolymer.

The alcohol that is used for the invention may have anywhere between 1–20 carbon atoms. Examples of suitable alcohol for the invention include but are not limited to methanol, ethanol, propanol, isopropanol, glycerol, ethylene glycol, and propylene glycol.

In some applications, a dioxirane precursor is included in the composition in addition to the alcohol, the polymer, and the PMPS. The presence of this precursor in the alcoholic gel results in the formation of dioxirane when the composition is dissolved in water. When the alcoholic gel comes in contact with water, the stable PMPS dissociates into solution, reacts with the precursor (carbonyl donor), and produces dioxirane, a powerful bleach with antimicrobial activity. Formulations containing a dioxirane precursor make effective antimicrobial agents, and may be used in hand cleansers as well as counter top, shower, hospital and household cleaners. The precursor may be any carbonyl donor such as an aldehyde or a ketone.

Suitable aldehydes can be employed and include but are not limited to: acetaldehyde, butyraldehyde, benzaldehyde, 4-trimethylammonio benzaldehyde methyl sulfate.

Suitable aliphatic ketones include but are not limited to: acetacetone, 2,3-hexanedione, trimethylammonio acetone nitrate, 5-diethylbenzylammonio 2-pentanone nitrate, 5-diethylmethylammonio 2-pentanone nitrate, methyl pyruvate, diethyl keto malonate, diethyl ketone, hydroxyacetone, hexachloracetone, 2,5-hexanedione, phenylacetone, ethyl levulinate, 3-hydroxy-2-pentanone, acetone, 3-penten-2-one, methyl ethyl ketone, 4-hydroxyl-3-methyl-2-butanone, 3-pentanone, 2-heptanone.

Suitable aromatic ketones include but are not limited to: acetophenone, hydroxyquinoline, 4-acetyl-1-methylpyridium nitrate, di-2-pyriyl ketone N-oxide, 2-acetylquinoxaline, 2-acetyl-3-methylquinoxaline, di-2-pyridyl ketone, 6-acetyl-1,2,4-trimethyl quinolinium nitrate, 8-hydroxyquinoline N-oxide, methyl phenyl glyoxalate, N-methyl-p-morpholinio acetophenone methyl sulfate, 3-acetyl pyridine N-oxide, p-nitroacetophenone, m-nitroacetophenone, sodium p-acetyl benzene sulfonate, p-acetylbenzonitrile, 3,5-dinitroacetophenone, 4-trimethylammonioacetophenone nitrate, 4-methoxy-3-nitroacetophenone, p-chloroacetophenone, p-diacetylbenzene, N-methyl-p-morpholinio acetophenone, phenacyltriphenylphosphonium nitrate, 20acetyl pyridine, 2-acetylpyridine N-oxide, 3-acetyl pyridine, 4-acetyl pyridine, 4-acetyl pyridine N-oxide, 2,6-diacetyl pyridine, 3-acetyl pyridine N-oxide, triacetylbenzene.

Suitable cyclic ketones include but are not limited to: cyclohexanone, 2-methylcyclohexanone, 2,6-dimethyl cyclohexanone, 3-methyl cyclohexanone, 4-ethyl cyclohexanone, 4-t-butyl cyclohexanone, 4,4-dimethyl cyclohexanone, methyl 4-oxo-cyclohexanone carboxylate, sodium 4-oxo-cyclohexanone carboxylate, 2-trimethylammoniocyclohexanone nitrate, 4-trimethylammonio cyclohexanone, nitrate, 3 oxo-cyclohexyl acetic acid, cycloheptanone, 1,4-cyclohexadione, dehydrochloric acid, tropinone methonitrate, N-methyl-3-oxoquinuclidium nitrate, cyclooctanone, cyclopentanone.

Suitable heterocyclic ketones include but are not limited to: 2,2,6,6-tetramethyl-4-piperidone hydrate, 1-methyl-4-piperidone N-oxide, N-carbethoxy 4-piperidone, tetrahydrothiopyran-4-one methonitrate, tetrahydrothiopyran-4-one S,S-dioxide, tetrahydrothiopyran-3-one,S,S,-dioxide, 4-oxacyclohexanone.

Also, ketones that possess a positive charge such as oxopiperidinium salts are also suitable.

Optionally, the composition of the invention may include a halogen donor. Halogen donors such as metal salts containing chloride, bromide or iodide can be included as precursor for the formation of hypohalite upon dilution of the stable gel with water. Furthermore, also optionally, N-imides can be combined into the alcoholic gel to provide for the formation of N-haloimides upon dilution with water.

Various additives may be included in the composition, as desired for the intended application. A pH buffer may be added to control the pH conditions for the formation of the desired conditions for oxidation, formation of oxidants and/or antimicrobial agents from the reaction between the PMPS and the precursors. Examples of pH buffers include but are not limited to organic acids such as acetic acid, citric acid, succinic acid, organic acid neutralizers such as morpholine, diethylaminoethanol, inorganic pH buffers such as mono-sodium phosphate, di-sodium phosphate, tri-sodium phosphate, polyphosphate, boric acid, borates, silicates, bicarbonates, carbonates, hydroxides, and oxides.

Quaternary ammonium chlorides (Quats), perfumes, and colorants may be added to further improve the performance and esthetics of the composition. For example quats provide an effective antimicrobial agent and surfactant characteristic. Examples of quats include but are not limited to cetyltrimethyl ammonium bromide, benzylkonium chloride, benzethonium chloride, cetylpyridinum chloride, tetrabutyl ammonium bromide and polymeric quaternary compounds.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention.

What is claimed is:

1. A stable oxidizing composition comprising
a potassium monopersulfate particle; and
an alcoholic gel surrounding The potassium monopersulfate particle, wherein the alcoholic gel includes an alcohol that is gelified by a polymer, and wherein the alcoholic gel exposes the potassium monopersulfate particle to water upon being diluted with water.

2. The composition of claim 1, wherein the potassium monopersulfate particle is part of a triple salt with the formula $2KHSO_5$—$KHSO_4$—$K_2SO_4$, wherein KHSO5 constitutes between about 40 wt. % and about 75 wt. % of the triple salt.

3. The composition of claim 1, wherein the potassium monopersulfate particle is part of a triple salt with the formula $2KHSO_5$—$KHSO_4$—$K_2SO_4$, wherein $KHSO_5$ constitutes between about 1 wt. % and about 30 wt. % of the composition.

4. The composition of claim 3, wherein the alcohol constitutes between about 50 wt. % and about 98 wt. % of the composition.

5. The composition of claim 1, wherein the alcohol has 20 or fewer carbons.

6. The composition of claim 1, wherein the polymer is present in an amount between about 0.1 wt. % and 10 wt. % of the alcohol.

7. The composition of claim 1, wherein the polymer is sodium polyacrylate.

8. The composition of claim 1, wherein the polymer is a polymer of acrylic acid crosslinked with a polyalkenyl polyether.

9. The composition of claim 8, wherein the polymer constitutes at most about 1 wt. % of the alcohol.

10. The composition of claim 1, wherein the potassium monopersulfate particle is coated with one of a polysaccharide, a silicate, and a polymeric material.

11. The composition of claim 10, wherein the polysaccharide is one of: chitin, chitosan, and cellulose acetate.

12. The composition of claim 10, wherein the silicate is one of: metasilicate, borosilicate, alkyl silicate, and polysiloxane.

13. The composition of claim 10, wherein the polymeric material is one of: a polymaleic acid, polyacrylic acid, polymethacrylate, polyacrylamide, and a sulfonated maleic anhydride copolymer.

14. The composition of claim 1 further comprising a dioxirane precursor that forms dioxirane upon dilution of the alcoholic gel with water.

15. The composition of claim 14, wherein the dioxirane precursor is present in an amount that is at most about 10% of the weight of the alcohol.

16. The composition of claim 14, wherein the dioxirane-forming precursor is selected from a group consisting of an aldehyde, an aliphatic ketone, an aromatic ketone, a cyclic ketone, a heterocyclic ketone, and a ketone possessing a positive charge.

17. The composition of claim 16, wherein the aldehyde is one of: acetaldehyde, butylaldehyde, benzaldehyde, and 4-trimethylammonio benzaldehyde methyl sulfate.

18. The composition of claim 16, wherein the aliphatic ketone is one of: acetacetone, 2,3-hexanedione, trimethylammonio acetone nitrate, 5-diethylbenzylammonio 2-pentanone nitrate, 5-diethylmethylammonio 2-pentanone nitrate, methyl pyruvate, diethyl keto malonate, diethyl ketone, hydroxyacetone, hexachloracetone, 2,5-hexanedione, phenylacetone, ethyl levulinate, 3-hydroxy-2-pentanone, acetone, 3-penten-2-one, methyl ethyl ketone, 4-hydroxyl-3-methyl-2-butanone, 3-pentanone, 2-heptanone.

19. The composition of claim 16, wherein the aromatic ketone is one of: acetophenone, hydroxyquinoline, 4-acetyl-1-methylpyridium nitrate, di-2-pyriyl ketone N-oxide, 2-acetylquinoxaline, 2-acetyl-3-methylquinoxaline, di-2-pyridyl ketone, 6-acetyl-1,2,4-trimethyl quinolinium nitrate, 8-hydroxyquinoline N-oxide, methyl phenyl glyoxalate, N-methyl-p-morpholinio acetophenone methyl sulfate, 3-acetyl pyridine N-oxide, p-nitroacetophenone, m-nitroacetophenone, sodium p-acetyl benzene sulfonate, p-acetylbenzonitrile, 3,5-dinitroacetophenone, 4-trimethylammonioacetophenone nitrate, 4-methoxy-3-nitroacetophenone, p-chloroacetophenone, p-diacetylbenzene, N-methyl-p-morpholinio acetophenone, phenacyltriphenylphosphonium nitrate, 20acetyl pyridine, 2-acetylpyridine N-oxide, 3-acetyl pyridine, 4-acetyl pyridine, 4-acetyl pyridine N-oxide, 2,6-diacetyl pyridine, 3-acetyl pyridine N-oxide, triacetylbenzene.

20. The composition of claim 16, wherein the cyclic ketone is one of: cyclohexanone; 2-methylcyclohexanone, 2,6-dimethyl cyclohexanone, 3-methyl cyclohexanone, 4-ethyl cyclohexanone, 4-t-butyl cyclohexanone, 4,4-dimethyl cyclohexanone, methyl 4-oxo-cyclohexanone carboxylate, sodium 4-oxo-cyclohexanone carboxylate, 2-trimethylammoniocyclohexanone nitrate, 4-trimethylammoniocyclohexanone, nitrate, 3 oxo-cyclohexyl acetic acid,cycloheptanone, 1,4-cyclohexadione, dehydrochloric acid, tropinone methonitrate, N-methyl-3-oxoquinuclidium nitrate, cyclooctanone, cyclopentanone.

21. The composition of claim 16, wherein the heterocyclic ketone is one of: 2,2,6,6-tetramethyl-4-piperidone hydrate, 1-methyl-4-piperidone N-oxide, N-carbethoxy 4-piperidone, tetrahydrothiopyran-4-one methonitrate, tetrahydrothiopyran-4-one S,S-dioxide, tetrahydrothiopyranO-one.S,S-dioxide, 4-oxacyclohexanone.

22. The composition of claim 16, wherein the ketone possessing a positive charge is an oxopiperidinium salt.

23. The composition of claim 1, wherein the alcohol is one of: methanol, ethanol, propanol, isopropanol, glycerol, ethylene glycol, and propylene glycol.

24. The composition of claim 1 further comprising a halogen donor suspended in the alcoholic gel, wherein the halogen donor forms a hypohalite upon dilution of the alcoholic gel with water.

25. The composition of claim 1 further comprising an N-imide suspended in the alcoholic gel, wherein the N-imide forms an N-haloimide upon dilution of the alcoholic gel with water.

26. The composition of claim 1 further comprising a pH buffer for controlling a pH of the alcoholic gel upon dilution with water.

27. The composition of claim 26, wherein the pH buffer is one of: acetic acid, citric acid, succinic acid, morpholine, dietbylaminoethanol, mono-sodium phosphate, di-sodium phosphate, ti-sodium phosphate, polyphosphate, boric acid, borate, silicate, a bicarbonate, a carbonate, a hydroxide, and an oxide.

28. The composition of claim 26, wherein the pH buffer is present in an amount that is at most 20 wt. % of the alcohol.

29. The composition of claim 1 further comprising an odor-controlling agent.

30. The composition of claim 1 further comprising a colorant.

31. The composition of claim 1 further comprising one of: cetyltrimethyl ammonium bromide, benzylkonium chloride, benzethonium chloride, cetylpyridinum chloride, tetrabutyl ammonium bromide, and polymeric quaternary compounds.

32. A method of preparing an oxidizing composition, the method comprising:
preparing an alcoholic gel by combining an alcohol with a polymer; and suspending a potassium monopersulfate particle in the alcoholic gel, wherein the alcoholic gel exposes the potassium monopersulfate particle to environment upon being mixed with water.

33. The method of claim 32, wherein the potassium monopersulfate particle is part of a triple salt with the formula 2KHSO5—KHSO4—K2SO4, wherein KHSO5 constitutes between about 40 wt. % and about 75 wt. % of the triple salt.

34. The method of claim 32 farther comprising adding the potassium monopersulfate particle in an amount that constitutes between about 1 wt. % and about 30 wt. % of the composition.

35. The method of claim 32 further comprising using the alcohol in an amount that constitutes between about 50 wt. % and about 98 wt. % of the composition.

36. The method of claim 35 further comprising using the polymer in an amount that is between about 0.1 wt. % and 10 wt. % of the alcohol.

37. The method of claim 32, wherein the polymer is sodium polyacrylate.

38. The method of claim 32, wherein the polymer is a homo- and co-polymer of acrylic acid crosslinked with a polyalkenyl polyether.

39. The method of claim 32 further comprising coating the potassium monopersulfate particle with one of a polysaccharide, a silicate, a polymeric material, and a copolymeric material.

40. The method of claim 32 further comprising adding a dioxirane precursor to the alcoholic gel, wherein the dioxirane precursor fonns dioxirane upon dilution of the alcoholic gel with water.

41. The method of claim 40, wherein the dioxirane precursor is added in an amount that does not exceed 10% of the weight of the alcohol.

42. The method of claim 32, wherein the alcohol is one of: methanol, ethanol, propanol, isopropanol, glycerol, ethylene glycol, and propylene glycol.

43. The method of claim 32 further comprising adding a halogen donor to the alcoholic gel, such that the halogen donor forms a hypohalite upon dilution of the alcoholic gel with water.

44. The method of claim 32 further comprising adding an N-imide suspended to the alcoholic gel, wherein the N-imide forms an N-haloimide upon dilution of the alcoholic gel with water.

45. The method of claim 32 further comprising adding a pH buffer to the alcoholic gel to control a pH of the alcoholic gel upon dilution with water.

46. The method of claim 45, wherein the pH buffer is one of: acetic acid, citric acid, succinic acid, morpholine, diethylaminoethanol, mono-sodium phosphate, di-sodium phosphate, tri-sodium phosphate, polyphosphate, boric acid, borate, silicate, a bicarbonate, a carbonate, a hydroxide, and an oxide.

47. The method of claim 45, wherein the pH buffer is added in an amount that does not exceed 20% of the weight of the alcohol.

48. The method of claim 32 further comprising adding an odor-controlling agent to the alcoholic gel.

49. The meted of claim 32 further comprising adding a colorant to the alcoholic gel.

50. The method of claim 32 further comprising adding one of cetyltrimethyl ammonium bromide, benzylkonium chloride, benzethonium, chloride, cetylpyridinum chloride, tetrabutyl ammonium bromide, and polymeric quaternary compounds to the alcoholic gel.

* * * * *